J. W. BUCHAN.
COMBINED STEERING AND DRIVING AXLE.
APPLICATION FILED JUNE 2, 1908.

939,795.

Patented Nov. 9, 1909.

WITNESSES

INVENTOR
James W. Buchan
BY
ATTORNEYS.

UNITED STATES PATENT OFFICE.

JAMES WASHINGTON BUCHAN, OF EASTMAN, GEORGIA, ASSIGNOR OF ONE-THIRD TO WILLIAM L. TAYLOR, OF EASTMAN, GEORGIA.

COMBINED STEERING AND DRIVING AXLE.

939,795.  Specification of Letters Patent.  Patented Nov. 9, 1909.

Application filed June 2, 1908. Serial No. 436,214.

*To all whom it may concern:*

Be it known that I, JAMES W. BUCHAN, a citizen of the United States, and a resident of Eastman, in the county of Dodge and State of Georgia, have invented a new and Improved Combined Steering and Driving Axle, of which the following is a full, clear, and exact description.

This invention relates to improvements for motor vehicles, and more particularly to such as have means for rendering the steering wheels capable of receiving power to aid in the propulsion of the vehicles.

The object of the invention is to provide a device of the class described, which combines the features of a steering and driving axle, and which is further provided with means whereby the wheel can be adjusted on the supporting sleeves of the steering knuckles as the bearings become worn.

The invention consists in the construction and combination of parts to be more fully described hereinafter and particularly set forth in the claims.

Reference is to be had to the accompanying drawings forming a part of this specification, in which similar characters of reference indicate corresponding parts in both views.

Figure 1:
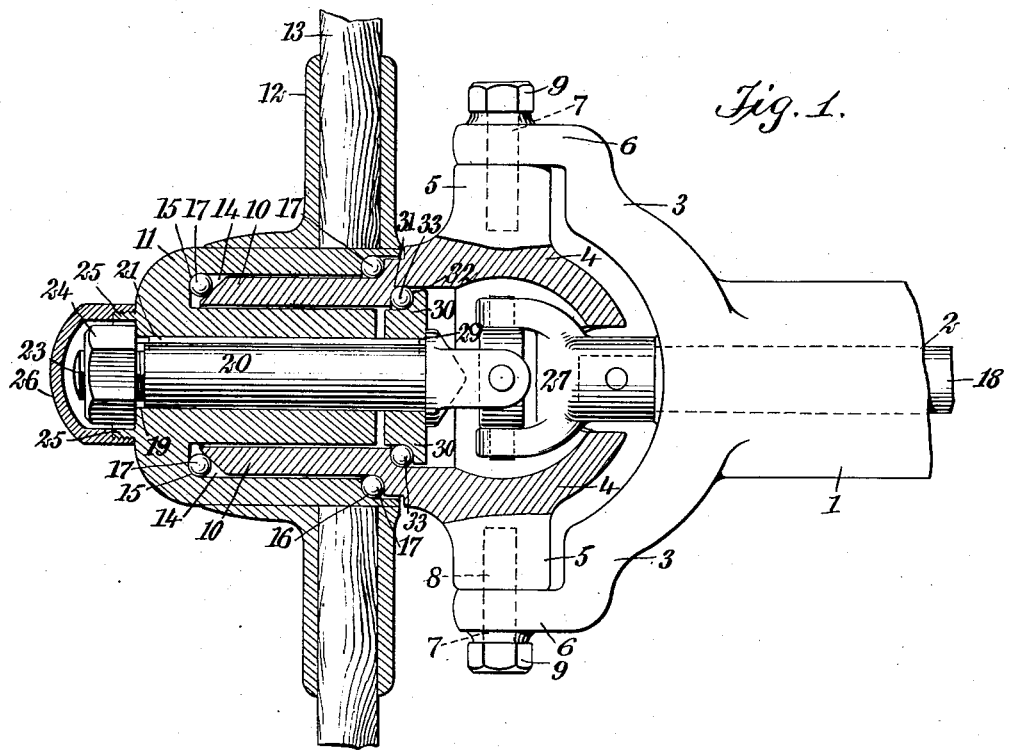
Figure 2:
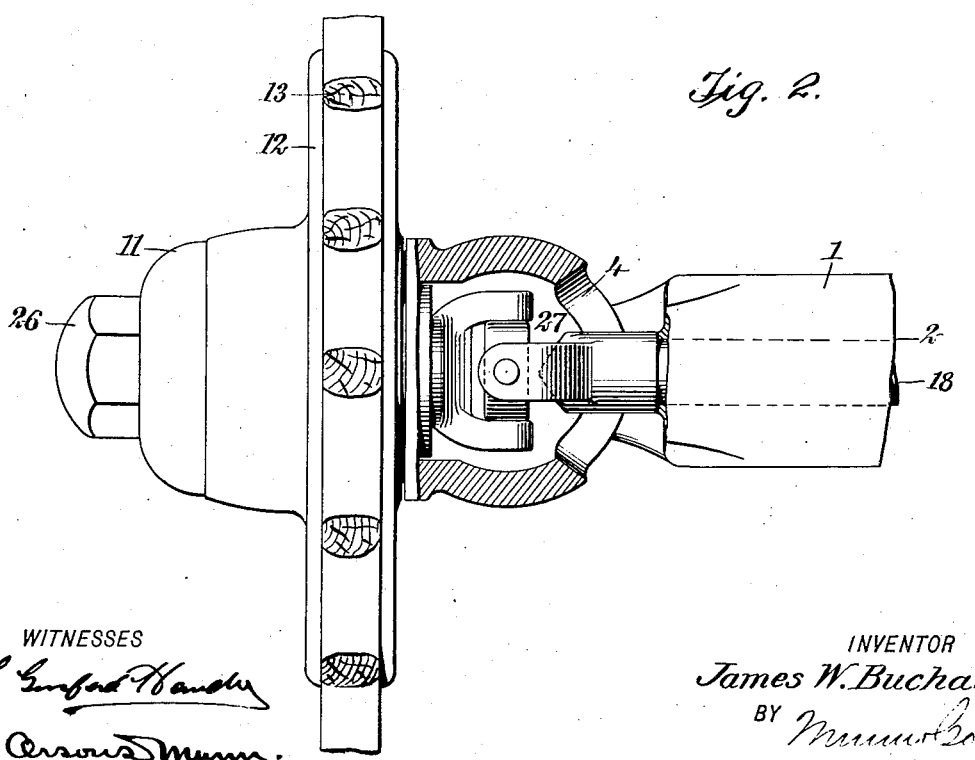

Figure 1 is a side elevation with parts broken away, showing an embodiment of my invention, and Fig. 2 is a top plan, portions being broken away.

Referring more particularly to the drawings, 1 represents an axle, of any common or preferred form, having an opening 2 extending therethrough, and having laterally extended arms 3. Arranged between the arms of the axle is a steering knuckle 4 having extensions 5 abutting against substantially parallel extensions 6 of the arms 3. Both the extensions of the arms and the steering knuckle have registering openings 7, in which pivots 8 are arranged, each of the latter having an adjusting nut 9 at one end thereof. The steering knuckle further has a supporting sleeve 10, on which the hub 11 of the wheel rests. A collar 12 is arranged upon the hub for holding the spokes 13 in place. The supporting sleeve 10 of the steering knuckle is arranged in an annular recess 14 of the hub. At the innermost portion of the recess 14 is a groove 15, and at the entrance to the recess and in the outer wall thereof, is a second groove 16. The supporting sleeve 10 which extends into the recess is spaced from these grooves to receive anti-friction rollers 17.

Arranged within the opening 2 of the axle 1 is a driving shaft 18. The hub 11 has an opening 19 extending therethrough, in which a pintle 20 is located. The latter is rigidly secured to the hub by means of a key 21 slidably arranged in a groove or recess, so that although the pintle may be moved longitudinally it cannot be rotated in respect to the hub. The outer end 23 of the pintle is suitably threaded to receive an adjustable nut 24. The hub has an annular threaded extension 25 about the end of the pintle for receiving a correspondingly threaded cap 26. Joining the pintle 20 and the driving shaft 18 at the steering knuckle is a universal joint 27, of any desired form. The pintle 20 adjacent to the universal joint has a shoulder 29, against which an annular member or race ring 30 abuts. This member 30 has a groove 32 opposite to a similar groove 31 in the supporting sleeve 10 of the steering knuckle, to form a race-way for receiving balls 33.

When the roller bearings become worn, it is simply necessary to tighten up on the nut 24 of the pintle. The tightening of the nut 24 moves the hub longitudinally of the pintle and along the key. The race ring 30 is held against longitudinal movement by the shoulder 29, so that the hub moves in respect to the race ring and all three of the bearings are adjusted by a single operation.

Having thus described my invention, I claim as new and desire to secure by Letters Patent:—

1. In a device of the class described, an axle having an opening therethrough, a driving shaft arranged in said opening, the axle being provided with laterally extending arms having parallel extensions, a steering knuckle arranged between the arms of the axle and having extensions engaging the parallel extensions of said arms and pivoted thereto, said steering knuckle having an outwardly extending supporting sleeve, a wheel having a hub provided with an opening extending centrally through the hub, the hub having an annular recess concentric with said opening for receiving the said supporting sleeve, the said recess opening at the inner end of the hub, a pintle extending through said central opening of the hub and connected with the driving shaft for the transmission of power to the wheel, the hub being mounted to slide on the pintle and to turn therewith, and means for adjusting the hub longitudinally on the pintle.

2. In a device of the class described, an axle having an opening therethrough, a driving shaft arranged within said opening and extending beyond the ends of said axle, said axle further having arms, a steering knuckle pivotally arranged between said arms and having an outwardly extending supporting sleeve, a wheel having a hub provided with an annular recess opening at the inner end of the hub for receiving the sleeve of said steering knuckle, grooves in said recess for holding rollers, the hub having an opening therethrough, a pintle arranged within said opening, the said pintle extending inward beyond the inner end of the hub, a key rigid with said pintle and arranged within a slot in said hub and adapted to move longitudinally in said slot, a universal joint connecting the inner end of said pintle to said driving shaft, an annular member arranged about said pintle and adjacent to said universal joint, said member having a recess to receive the key of said pintle, rollers located between said member and said supporting sleeve of said steering knuckle, and means at the outer end of said pintle, remote from said universal joint, whereby said member, said supporting sleeve and said hub may be adjusted with respect to one another.

3. In a device of the class described, an axle having an opening therethrough, a driving shaft arranged within said opening, the axle having arms, a steering knuckle arranged between said arms and having extensions pivoted thereto, the said steering knuckle having an integral supporting sleeve, a hub having an axial opening therethrough and an annular recess concentric with said opening, the said recess opening at the inner end of the hub and adapted to receive said sleeve, a pintle extending through said axial opening of the hub, the hub being mounted to slide on said pintle but non rotatable in respect thereto, the said pintle projecting beyond the inner end of the hub and having a shoulder on its inner portion, a driving connection between the driving shaft and the inner end of the pintle, an annular member rigidly held on said pintle at the inner end of the body of the hub and engaging the said shoulder, bearings interposed between the ends of the sleeve and said annular member and the innermost portion of the recess respectively, and means for moving the hub longitudinally on the pintle to adjust said bearings.

4. In a device of the class described, an axle having an opening therethrough, a driving shaft arranged within said opening and extending beyond the ends of said axle, said axle having arms, a steering knuckle pivotally arranged between said arms and having an integral supporting sleeve, a wheel having a hub provided with an annular recess opening at the inner end of the hub for receiving the sleeve of the steering knuckle, the hub having an opening therethrough, a pintle arranged in said opening and extending beyond the ends of the hub, the pintle being provided with a longitudinal key engaging a slot in said hub, a universal joint connecting the inner projecting end of said pintle with the driving shaft, an annular member held on said inner projecting end of the pintle adjacent to the universal joint, and means at the outer end of said pintle for adjusting the hub on said supporting sleeve.

5. In a device of the class described, a hollow axle having laterally extending arms provided with parallel extensions, a steering knuckle arranged between the arms of the axle, and having extensions abutting against the said parallel extensions of the arms of the axle, pivots connecting the extensions of the said arms and the steering knuckle, the said steering knuckle having an outwardly extending supporting sleeve, a wheel having a hub provided with an annular recess for receiving the supporting sleeve of the knuckle, the said recess opening at the inner end of the hub, the wall at the inner end of the recess being provided with a groove, and a second groove being formed at the entrance of the recess in the outer wall, bearings in said grooves between the said sleeve and said hub, a pintle extending through a central opening in the body of the hub and projecting beyond the inner end of the hub, the hub being mounted to slide on the pintle and to turn therewith, a driving shaft arranged in the hollow axle, a universal joint connecting the inner projecting end of the pintle with the driving shaft, the said pintle having a shoulder on its inner end between the inner end of the body of the hub and the universal joint, an annular member held on the pintle at the inner end of the body of the hub and engaging the said shoulder, the said member being spaced from the body of the hub, bearings located between said annular member and the supporting sleeve of the steering knuckle, and means for moving the hub longitudinally on the pintle to adjust said bearings.

In testimony whereof I have signed my name to this specification in the presence of two subscribing witnesses.

JAMES WASHINGTON BUCHAN.

Witnesses:
B. H. WAGNON,
WRIGHT CAMPBELL.